United States Patent
Peitz

(10) Patent No.: US 10,432,239 B2
(45) Date of Patent: Oct. 1, 2019

(54) LIGHTING DEVICE AND METHOD FOR SUPPLYING A WIRELESS TRANSMISSION MODULE

(71) Applicant: OSRAM GMBH, München (DE)

(72) Inventor: Christoph Peitz, Lippstadt (DE)

(73) Assignee: OSRAM GMBH, München (DE)

( * ) Notice: Subject to any disclaimer, the term of this patent is extended or adjusted under 35 U.S.C. 154(b) by 0 days.

(21) Appl. No.: 15/775,261

(22) PCT Filed: Oct. 26, 2016

(86) PCT No.: PCT/EP2016/075817
§ 371 (c)(1),
(2) Date: May 10, 2018

(87) PCT Pub. No.: WO2017/080828
PCT Pub. Date: May 18, 2017

(65) Prior Publication Data
US 2018/0375537 A1    Dec. 27, 2018

(30) Foreign Application Priority Data

Nov. 13, 2015  (DE) .......................... 10 2015 119 627

(51) Int. Cl.
*H04B 1/38* (2015.01)
*H04B 1/03* (2006.01)
(Continued)

(52) U.S. Cl.
CPC ............... *H04B 1/03* (2013.01); *F21V 33/00* (2013.01); *H04B 17/11* (2015.01); *H05B 37/0272* (2013.01)

(58) Field of Classification Search
CPC ...... H04B 17/11; H04B 1/03; H05B 37/0272; H05B 37/029; F21V 33/00
See application file for complete search history.

(56) References Cited

U.S. PATENT DOCUMENTS 8,653,984 B2 * 2/2014 Ivey .................... F21V 33/0076
340/815.4
2012/0218978 A1  8/2012 Ishidoshiro
(Continued)

FOREIGN PATENT DOCUMENTS

CN  104 121 507 A  10/2014
EP  1263150 A2   12/2002

OTHER PUBLICATIONS

PCT; App. No. PCT/EP2016/075817; International Search Report and Written Opinion dated Feb. 7, 2017.
(Continued)

*Primary Examiner* — Nhan T Le
(74) *Attorney, Agent, or Firm* — Fitch, Even, Tabin & Flannery LLP

(57) ABSTRACT

The invention relates to a lighting device, comprising a first lighting means and a transmission module for wireless transmission and for providing a position identification signal comprising position determination data. The lighting device also comprises an electronic operating device for operating the first lighting means, wherein the electronic operating device is coupled on the input side to an electrical supply connection of the lighting device and on the output side to the first lighting means by a first connection device. The electronic operating device comprises an energy converter for supplying the transmission module with electrical energy. The invention further relates to a system for providing a position indication having a plurality of such lighting devices. In addition, the invention relates to a method for operating a lighting device having a first lighting means by providing a position identification signal comprising position determination data by means of a transmission module.

16 Claims, 6 Drawing Sheets

(51) Int. Cl.
*H05B 37/02* (2006.01)
*H04B 17/11* (2015.01)
*F21V 33/00* (2006.01)

(56) References Cited

U.S. PATENT DOCUMENTS

2013/0331037 A1    12/2013  Kusakari
2013/0331038 A1*  12/2013  Kusakari .................. H04B 1/03
                                                                                              455/66.1
2015/0256963 A1     9/2015  Dahlen

OTHER PUBLICATIONS

Manandhar, Dinesh and Torimoto, Hideyuki. "Development of IMES installation, setup and management system." Proceedings of the 24th International Technical Meeting of The Satellite Division of the Institute of Navigation. Portland, Oregon. pp. 1507-1513. 2011. Sep. 19-23, 2011.

* cited by examiner

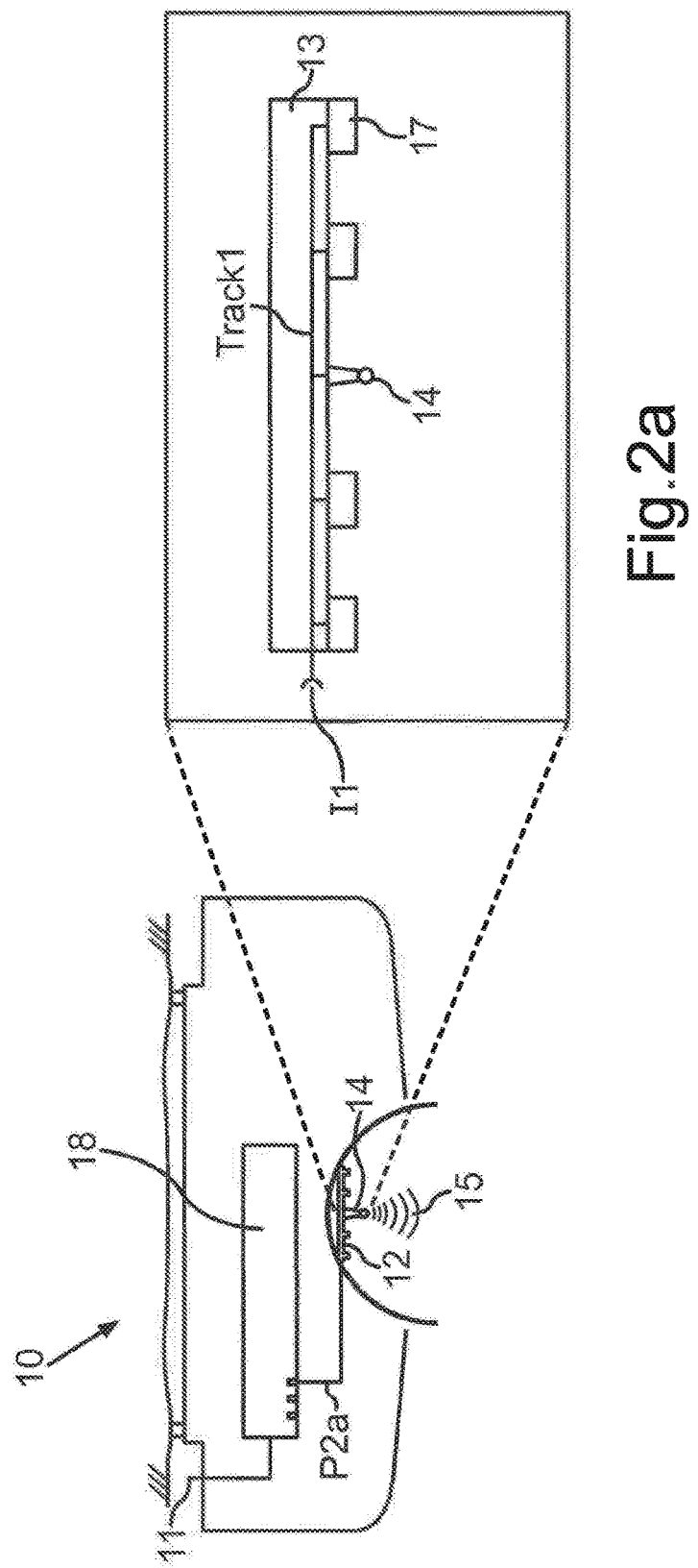

LIGHTING DEVICE AND METHOD FOR SUPPLYING A WIRELESS TRANSMISSION MODULE

CROSS-REFERENCE TO RELATED APPLICATIONS

This application is a U.S. national phase application filed under 35 U.S.C. § 371 of International Application Number PCT/EP2016/075817, filed Oct. 26, 2016, designating the United States, which claims benefit of German Patent application No. 10 2015 119 627.1 filed on Nov. 13, 2015.

FIELD

The invention relates to a lighting device according to the preamble of claim 1. Furthermore, the invention relates to a system with a plurality of such lighting devices. Moreover, the invention relates to a method for operating a lighting device according to the preamble of claim 14.

BACKGROUND

Due to their spatially well distributed arrangement, lighting devices lend themselves to serve as a support of a transmission module for providing data by means of wireless transmission for diverse applications. A generic lighting device is known from EP 1 263 150 B1. Moreover, a data transmission system with a local beacon is known from EP 1 263 150 B1, which is in communication link with controlling and/or information communicating infrastructure devices, for example a central service server or the Internet, and/or with one or more further local beacons on the one hand and which contains a combined transmitting/receiving device or only a pure transmitting device in particular cases for wireless communication link with one or more terminals located in its environment on the other hand, and which is arranged in, at or at the location of an electrical lighting device. The local beacon is provided with a storage and/or processing functionality operated in intelligent manner relating to the data to be wirelessly transmitted, wherein the storage functionality of the local beacon is in providing information such that this information can then be delivered to users multiply equipped with an appropriate terminal without having to be caught up by the infrastructure devices each time, and in that the processing functionality is in that certain processing operations, which otherwise are carried out in a central processing unit of the infrastructure devices or in the terminal itself, are outsourced to the local beacon.

The local beacon known from the prior art for a data transmission system based on lighting device only uses the current supply of the lighting means associated with the lighting device.

Therefore, it is the object of the present invention to provide a lighting device, a system as well as a method, which allows improved integration of a transmission module for providing data by means of wireless transmission.

SUMMARY

This object is solved by a lighting device having the features of claim 1, a system having the features of claim 13 as well as by a method having the features of claim 14. Advantageous developments of the present invention are the subject matter of the dependent claims.

The invention is based on a lighting device including a first lighting means and a wireless transmission module for wireless transmission and for providing a position identification signal including position determination data. The invention is developed by an electronic operating device for operating the first lighting means, wherein the electronic operating device is coupled to an electrical supply connection of the lighting device on the input side and to the first lighting means by means of a first connection device on the output side, wherein the electronic operating device includes an energy converter for supplying the transmission module with electrical energy.

The invention is based on the realization that redundant functional assemblies can be saved by the synergetic utilization of components within a lighting device. An electronic operating device usually comprises a control device, the operating voltage of which is in a range, by which the transmission module can also be operated. Thus, both a more inexpensive and a more compact construction can be achieved.

This advantage in particular takes effect if the lighting device is a LED lamp, in which the first lighting means is formed as a LED module and the LED lamp thus can have substantially higher degrees of freedom in the lamp design compared to lamps with traditional lighting means such as for example glow lamps, fluorescent lamps or high-pressure gas discharge lamps. For example, in the configuration as a so-called linear fluorescent luminary, a LED lamp can be very flatly formed. In the configuration as a downlight, which are usually designed for the ceiling installation and have a round cross-section, a reduced installation depth can be achieved.

According to an advantageous development, the transmission module is arranged immediately on the first lighting means, in particular formed integrally with it. Thus, it can for example be provided in a LED lighting means that one or more LED structural elements are arranged on a LED support module. The LED support module can for example be a printed circuit board (PCB). Light emitting diodes (LED) for lighting applications are usually mounted in SMD housings for surface mounting (SMD—surface mount device) on the printed circuit board. Hereby, a compact construction of the LED lighting means can be achieved. The electrical supply connection can for example be a standard mains voltage connection with 230 Volts/50 Hertz. The energy converter is in particular a clocked electronic energy converter, which is usually also referred to as switching power supply. Herein, it can preferably be provided that the energy converter provides a galvanic separation to the feeding network, which is connected to the electrical supply connection.

According to a preferred embodiment, the operating device comprises a second connection device for the transmission module different from the first connection device for the first lighting means. Thereby, a pre-customizable plug connection can be advantageously used to connect the transmission module to the operating device. Hereby, a universal usability of the components of a lighting device is allowed on the one hand, in particular exchangeability, in which mechanically differently configured components can be operated via a uniform electrical interface. Furthermore, independency of special requirements to the connection for the first lighting means is given, for example with regard to the provided voltage at this connection.

According to a further advantageous embodiment, the second connection device is formed by a connection device for a second lighting means, which is formed functionally identical to the first connection device. In this manner, the second lighting means can be replaced with the transmission module in a lighting device, which is designed at least for the operation of a first lighting means and a second lighting means, whereby a particularly simple possibility of integration of the transmission module arises. Such a configuration is in particular suitable for lighting devices, in which multiple lighting means are operated in parallel or on multiple channels of the electronic operating device controllable independently of each other.

However, it can also be provided that in a lighting device, which is only designed for the operation of a first lighting means, the first lighting means is replaced with the transmission module. Such a configuration can in particular lend itself for lighting devices with low power, which accordingly are arranged in higher number for example distributed in a room. In this case, the lack of a lighting means does not further have a disturbing effect, in reverse, one obtains a simplified installation within the room with a uniform wiring to a common lighting system.

Hereby, the further advantage in particular arises that the location of a transmission module can also be changed afterwards after the installation of the lighting devices without problems. Hereto, it is only required that the respective lighting means of the lighting device is coupled to the respective electronic operating device of the lighting device via a detachable connection.

According to a further advantageous embodiment, at least the first connection device comprises a readout device, which is adapted to read out at least one operating value presettable by a compatible first lighting means, in particular a rated current, and to provide the quantity correlated with the operating value via the connection device. A standardized interface for adjusting the correct LED module current at an operating device, which is formed as a LED wide-range driver, is for example known under the designation LEDset. Thus, it can for example be provided that the readout device is adapted to ascertain operating parameters of a transmission module connected instead of the first lighting means via this interface and to provide the required values with respect to current and/or voltage at the first connection device. Thus, exchange of the first lighting means for a transmission module as an alternative equipment variant is possible in particularly simple manner.

According to a further advantageous embodiment, the transmission module comprises an interface, by means of which the position identification signal to be emitted by the transmission module is adjustable with respect to physical signal characteristics. The interface can be designed for wired communication or for wireless communication. Preferably, it is provided that one or more of the following operating parameters or adjustments of the transmission module are adjustable via the data interface of the transmission module:
  switching on/switching off of the position identification signal,
  transmitting interval between two consecutive transmissions of the position determination data by means of the position identification signal,
  transmitting power of the position identification signal,
  reset to a delivery condition to factory settings, and
  calling energy management operating modes.

Besides, the data interface is preferably adapted to communicate the transmitting content at least including the position determination data to the transmission module, wherein association information and/or directly the mounting position of the lighting device can be provided here, as well as further contents for receiver systems with connection to data processing.

Besides, it can also be provided to provide a key for encrypting the position determination data to be transmitted by the transmission module via the data interface. One or more of the above mentioned adjusting/operating parameters can be provided via the data interface by a superordinated data network, for example a light and/or building management system.

According to an advantageous development, the operating device is adapted to control the interface of the transmission module via the second connection device. Thus, it can be provided that the data interface and the energy interface are formed integrated in a single connection device, for example formed by a multi-pole plug connection. In an advantageous development, the interface is formed as a two-wire interface, in particular as a combined energy/data interface.

For example, it can be provided to form an electrical connection between the transmission module and the electronic operating device by means of four lines, namely a reference line, a supply line, a receiving line and a transmitting line, whereby full-duplex operation is allowed.

Furthermore, it can be provided that the electrical connection between the transmission module and the electronic operating device is realized by means of three lines, namely a reference line, a supply line and a common transmitting and receiving line, whereby half-duplex operation is allowed.

In particular with a low data traffic, thus if only single operating/adjusting parameters are to be changed, wherein comparatively low requirements to the data transfer rate are made, for example 1.2 to 9.6 kilobits per second, the energy supply and the data transmission can be particularly advantageously effected via the same line pair. Such a form of the data transmission in the half-duplex operation is for example known from the DALI standard, which is employed for light control.

According to an advantageous development, the operating device is adapted to transmit the adjusting parameters via the interface to the transmission module depending on a signal of a superordinated light control system capable of being provided at a control interface of the operating device, wherein this signal includes adjusting parameters for the transmission module. Herein, embodiments are conceivable, in which the operating device is adapted to convert the data obtained from the superordinated light control system according to a first data protocol format to a second data protocol format and to transmit it to the transmission module conformably to the second data protocol format. Alternatively, it can be provided that the transmission module itself supports the same protocol format as the superordinated light control system such that the data provided by the superordinated light control system, which is intended for the transmission module, is directly forwarded from the operating device to the transmission module. In particular, it can be provided that the transmission module has an own address or a sub-address such that the operating device can also provide all of the received data from the superordinated light control system to the transmission module in parallel manner, which is capable of autonomously ascertaining the data intended for the transmission module. Thereby, a particularly simple control of the data flow from the superordinated light control system can be effected.

According to a further advantageous embodiment, the lighting device comprises an environmental sensor, wherein the operating device is adapted to adjust at least one physical signal characteristic of the position identification signal to be emitted by the transmission module depending on an environmental parameter ascertained by means of the environmental sensor. The environmental sensor can particularly preferably be a camera. A height of a room, in which the lighting device is mounted, can for example be ascertained or at least approximately estimated based on known items such as for example based on a chair via it. Similarly, it is possible to capture obstacles, for example cupboards or shelves. In that the physical signal characteristics are adjustable, they can be optimized with regard to the concrete installation situation. Thus, a transmitting power can for example be reduced to avoid disturbing reflections on a shelf.

Similarly, it can be provided to adjust the radiation characteristic of the transmission module, thus in particular an orientation and an aperture angle of a transmission cone, depending on the ascertained environment. In this context, reference is made to the parallel patent application with the same date of filing, internal file number 2015P01318 DE with the title "lighting device with directed radio signal for position identification", according to which a transmitting unit of the lighting device is adapted to transmit a position identification signal in the form of a directed radio signal with a presettable radiation characteristic, wherein in particular an antenna element effective for the radiation of the position identification signal is adjustable with respect to a radiation direction with respect to the lighting device and/or with respect to an aperture angle of a radiation cone.

According to a further advantageous embodiment, the transmission module is adapted to bidirectionally communicate with a control unit capable of being provided outside of the lighting device at least in a calibration operating mode of the transmission module. The calibration operating mode can be present in addition or alternatively to the intended operating mode. For example, a calibration operating mode can be started when the lighting device is put into operation, thus with switching on of an associated energy supply. In this case, the calibration operating mode can remain activated for a presettable period of time. Similarly, it can be provided that a calibration operating mode is controlled via the electronic operating device. Similarly, a calibration operating mode can also be initiated by an environmental sensor of the lighting device, for example a radar sensor, an ultrasonic sensor or a laser-based distance sensor.

The control unit capable of being provided outside of the lighting device can for example be a mobile terminal, in particular a smart phone, a tablet PC or a notebook/laptop. However, the control unit capable of being provided outside of the lighting device can also be a light/building management system, which can exchange data with the transmission module for example via a wired communication channel.

In addition, it can be provided that the operating device is adapted to additionally output the position determination data by means of the lighting means via light-based communication. Herein, an independent activatability of the light-based communication and the radio-based communication is particularly preferably provided. In this manner, the accuracy of location can for example be centrally influenced such that an accuracy can optionally be improved or even reduced.

According to a further advantageous embodiment, the first lighting means includes at least one LED module, wherein the transmission module is coupled to at least one LED of the LED module, in particular to exactly one LED of the LED module, in parallel manner for supply with electrical energy. Hereby, the transmission module can be fed from a voltage, which drops at the at least one LED in operating the LED. In this case, the energy converter serves for supplying both the LED module and the transmission module with electrical energy.

Preferably, a system for providing a position indication includes a plurality of lighting devices according to the invention, wherein the position determination data of the lighting devices each includes an identification number unique within the system, as well as with a data storage unit including a user interface, wherein the installation location of the respective lighting device is stored as a function of the respective identification number in the data storage unit for each lighting device of the system, wherein the data storage unit is adapted to output the position indication via the user interface depending on the respective identification number, which is receivable via the user interface. A system according to the invention results herefrom.

The data storage unit can for example be a server, which provides the position indication to a mobile terminal, for example a smart phone, via the user interface for example in the form of a WLAN link. Alternatively, it can be provided that the data storage unit is implemented in a mobile terminal such that offline operation for position determination is allowed, which is not restricted to a permanent data link to a server. Rather, it can be provided that the configuration of the lighting system is registered via the installation of a corresponding application software on the mobile terminal. In this manner, position ascertainment is also possible at locations, at which access to a WLAN network or a mobile radio network does not exist such that it does not have to be resorted to an external data storage unit.

Furthermore, the invention is based on a method for operating a lighting device with a first lighting means by providing a position identification signal including position determination data by a transmission module. According to the invention, the method is developed by operating the first lighting means by an electronic operating device and supplying the transmission module with electrical energy by an energy converter of the electronic operating device. Hereby, a synergetic cooperation in operating the components in a lighting device arises in advantageous manner, whereby savings with respect to construction volume and material can arise and in particular an improved energy efficiency by common use of components. Thus, a control device present in the electronic operating device can for example be conveniently commonly supplied with the transmission module for controlling a power-electronic actuator, whereby the necessity of a second energy converter is omitted.

The advantages and features as well as embodiments described for the lighting device according to the invention similarly apply to the system according to the invention and equally to corresponding methods and vice versa. Accordingly, for device features, corresponding method features can be provided and vice versa.

The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be regarded as encompassed and disclosed by the invention, which are not explicitly shown in the figures or explained, but arise from and can be generated by separated feature combinations from the explained implementations.

BRIEF DESCRIPTION OF THE DRAWINGS

Further advantages and features are apparent based on the following description of embodiments considering the attached figures. In the figures, identical reference characters denote identical features and functions.

There is show in.

DESCRIPTION OF THE PREFERRED EMBODIMENTS

Battery-operated beacons have a high maintenance requirement since the batteries have to be regularly exchanged here. The operation of beacons directly on a supply network, for example the 230 Volts/50 Hertz AC voltage network, requires either a plurality of distributed switching power supplies or an additional line infrastructure for the beacons with a supply from a central power supply. The additional effort can be avoided if beacons are directly combined with lighting devices since modern lighting devices have an electronic operating device anyway, which is permanently connected to the AC voltage network, wherein it is preset via a control interface if an associated lighting means is to be switched on or off and optionally in which dimming position the operation is to be effected.

Figure 1:
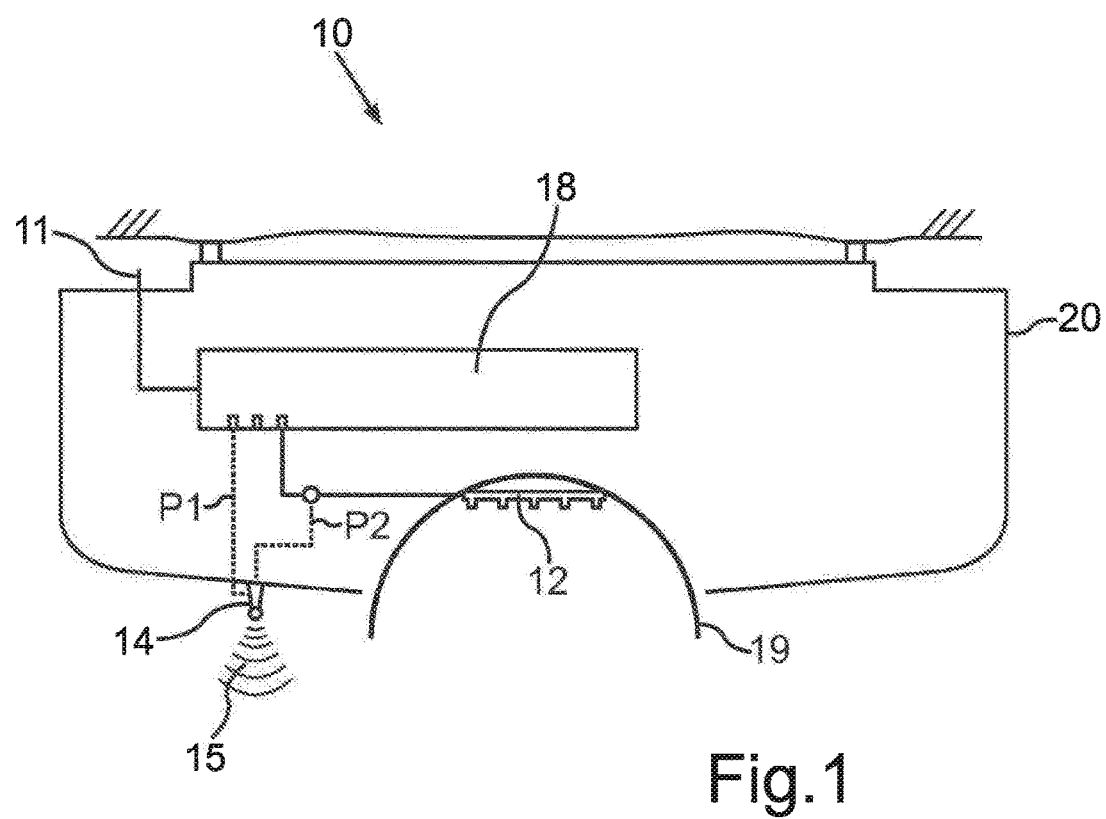
FIG. 1 in simplified schematic representation (sectional side view) a preferred first embodiment of a lighting device according to the invention with two different energy supply options, FIG. 2a in simplified schematic representation (sectional side view) a preferred second embodiment of a lighting device according to the invention, FIG. 2b in simplified schematic representation (sectional side view) a preferred third embodiment of a lighting device according to the invention, FIG. 3 in simplified schematic representation (sectional side view) a preferred fourth embodiment of a lighting device according to the invention, FIG. 4 in simplified schematic representation the startup and control of the lighting devices installed in a lighting installation, and FIG. 5 in simplified schematic representation a preferred embodiment of a system according to the invention for providing a position indication to a mobile terminal.

A preferred first embodiment of a lighting device according to the invention in the form of a lamp 10 is illustrated in FIG. 1. The lamp 10 includes a supply connection 11, via which the energy supply to an electronic operating device 18 (ballast) for operating a lighting means 12 is effected. The lamp 10 comprises a housing 20 as well as a reflector 19. At the bottom of the housing 20, a beacon 14 is arranged, which serves as a transmission module for wirelessly transmitting and providing a radio signal 15 including position determination data. The mutilated word means arranged.

For energy supply of the beacon, an energy interface is realized in the lamp 10. Compared to a battery-operated beacon, now, the maintenance processes for battery exchange are omitted. In the representation according to FIG. 1, two variants for energy supply of the beacon 14 are illustrated.

With a supply via a first energy supply line P1, the operating device 18 comprises a separate connection, via which the beacon 14 is supplied with energy. This has the advantage that a voltage and/or a current for supplying the beacon 14 can be adjusted independently of corresponding values, which are to be provided for the lighting means 12. A further advantage is in that the beacon 14 is also supplied with the lighting means 12 switched off.

In the alternative embodiment with a supply of the beacon 14 via the second energy supply line P2, thus, the beacon 14 is coupled to the lighting means 12. Thus, the beacon 14 can be supplied with energy from the operating device 18 via an own line. This can be either a corresponding line for energy supply of LEDs on the lighting means 12 or a separate channel provided thereto.

The second energy supply line P2 can be branched already at the operating device 18 such that a double connection device is correspondingly provided directly at the electronic operating device 18. Alternatively, it can be provided that the operating device 18 comprises only a single connection for the lighting means 12 and the beacon 14 and that the required branch is realized by a Y cable.

A preferred second embodiment with an energy supply, which corresponds to the energy supply via the second energy supply line P2, as illustrated in FIG. 1, is illustrated in more detail in FIG. 2a. Herein, the lighting means 12 is coupled to the operating device 18 via a third energy supply line P2a. For the sake of simplicity, the respective line is only illustrated in one-pole manner. The third energy supply line P2a is coupled to a first energy supply connection 11 of the lighting means 12, which is presently composed of a LED support module 13 with LEDS 17 mounted thereon as well as the beacon 14. The LED support module 13 can in particular be a printed circuit board (PCB). The lighting means 12 comprises a track Track1, which leads from the first connection 11 to each of the LEDs 17 as well as to the beacon 14. In this manner, a particularly simple connection of the beacon 14 to the operating device 18 is realized.

Figure 2B:
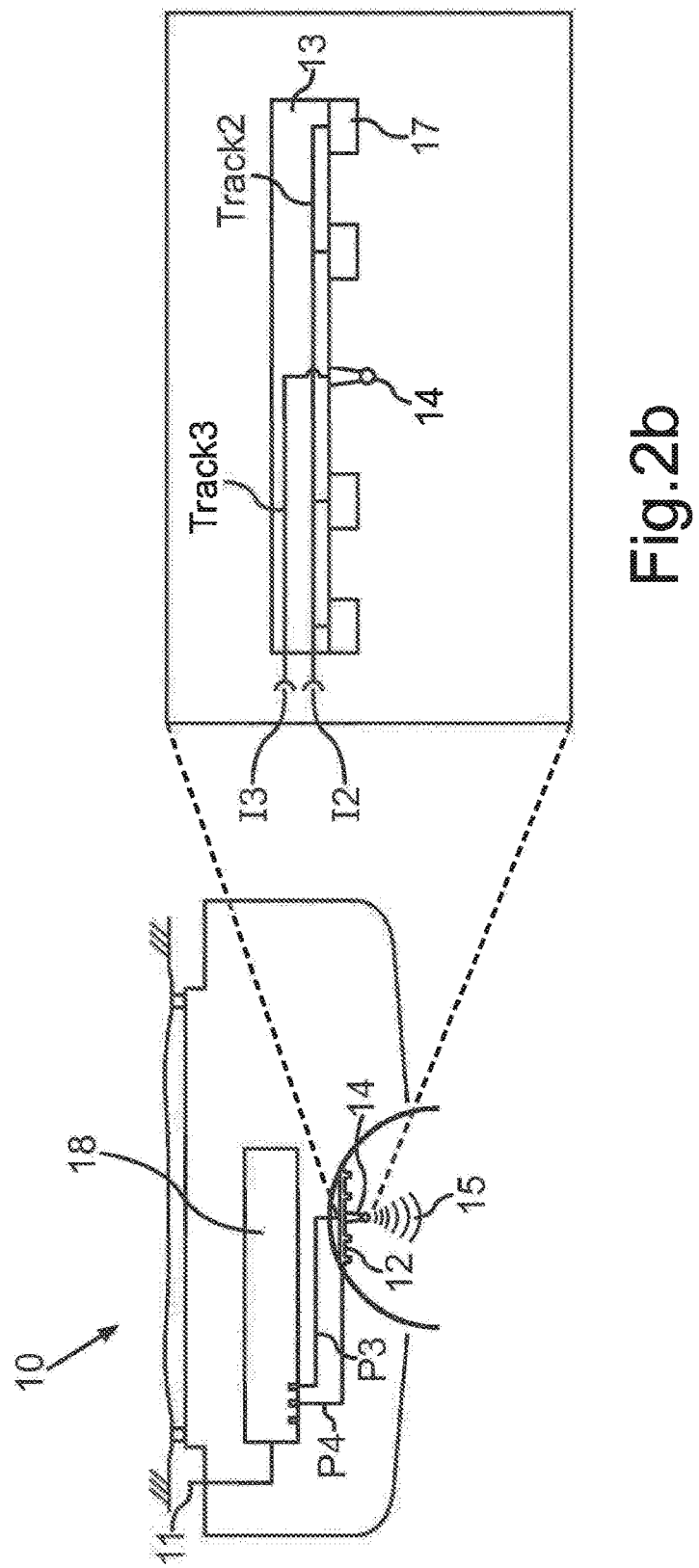

According to a third embodiment alternative to the second embodiment according to the representation in FIG. 2b, the beacon 14 is arranged on the lighting means 12 as previously, but has an own connection for energy supply. A third energy supply line P3 is coupled to a third connection 13 of the lighting means 12, from which a third track Track3 leads to the beacon 14. A fourth supply line P4 is coupled between the operating device 18 and a second connection 12 of the lighting means 12, wherein the individual LEDs 17 of the lighting means 12 are connected via a second track Track2 in the third embodiment. The third embodiment has the advantage that the beacon 14 is arranged on the lighting means 12 and nevertheless can be operated independently thereof. Thereto, the beacon 14 is mounted on the LED support module 13 and for example connected to the operating device 18 (LED ballast) via tracks and a cable. The parallel use of the energy supply of the LEDs 17 to thereby supply the beacon 14 at the same time is in particular reasonable with a permanently switched on lighting installation. Thus, as illustrated in FIG. 2b, a separate circuit can be realized for the beacon 14 with own tracks on the LED support module 13, separate cables for the two feeds via the second connection 12 and the third connection 13 as well as a separate channel at the operating device 18.

Figure 3:
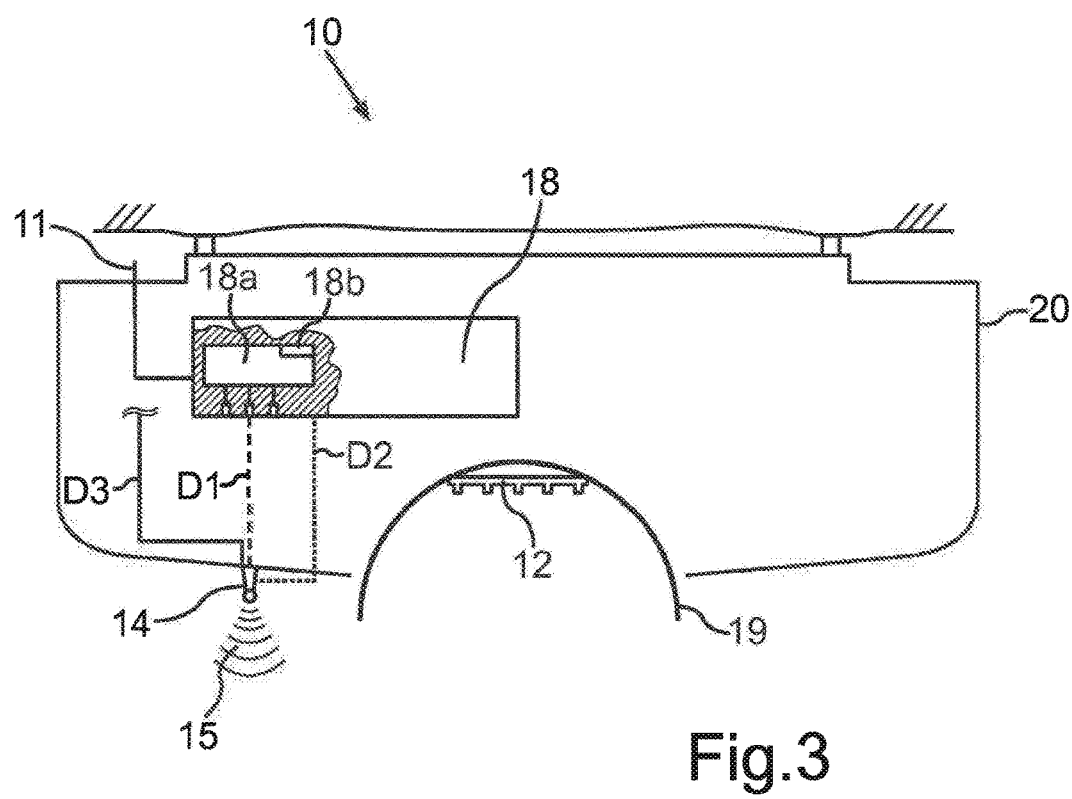

A preferred fourth embodiment is illustrated in FIG. 3. Herein, the representation of the respective energy interfaces was omitted for the sake of clarity. Here, the focus of the representation is on the control of the beacon 14, which can preferably be effected in one of the three illustrated ways. The electronic operating device 18 further comprises a control device 18a in the fourth embodiment, which can optionally incorporate a data interface 18b for wireless signal transmission.

An identification number ID emitted by the beacon 14 by means of the radio signal 15 can be modified by means of a control, for example to adapt the identification number ID in fixed intervals according to a preset scheme. Thereby, the access by any foreign receiving devices is restricted since a dynamic encryption of the position determination data transmitted by means of the radio signal 15, in particular of the identification number ID, is now realized. For controlling the beacon 14, the control signal can be transmitted by data cable, Powerline, WLAN, Bluetooth, Ethernet/Power or Ethernet or by means of similar technologies.

Herein, the control signal generator can be the operating device 18 itself, which is convenient with a direct electrical connection to each other, illustrated in FIG. 3 by the control device 18a, which is coupled to the beacon 14 via a first data line D1. Instead of a wired data link, a wireless data link D2 to the beacon 14 can also be established via the interface 18b. A further possibility presents itself via a third data link D3, in which the beacon 14 is coupled to an external, separate control unit. Hereto, the already mentioned transmission technologies are employable.

Hereto, it can conveniently be provided to use an already present interface of the electronic operating device for saving an own interface component, which can present a not insignificant effort according to transmission technology, such that certain data packets are for example forwarded from the control 18a to the beacon 14 vie the first data link D1. This physically means a provision of the data via a local interface from the operating device 18, which can for example be realized with low effort as an 12C interface or as a UART interface (Universal Asynchronous Receiver Transmitter), which are already present as interface assembly implemented on hardwire side on many currently available microcontrollers. Via such a data link, reliable transmission is possible in particular with low data amounts to be transmitted due to the low selectable data transfer rate. In environments prone to disruptions, however, it can be advantageous to fall back on another protocol for serial data transmission, for example by means of a so-called biphase encoding or Manchester encoding.

Furthermore, it can be provided to adjust a transmitting interval and/or the signal strength of the position information signal 15 emitted by the beacon 14 by means of a control. Herein, the transmitting interval characterizes a distance between two consecutive data packets sent via the radio signal 15, which each contain the position determination data, wherein the distance is preferably in the range between 200 milliseconds and 500 milliseconds or a pulse sequence resulting therefrom has a frequency between 5 Hertz and 2 Hertz. This adjustability can be provided to be able to modify an accuracy of the location.

For startup and for control of the beacon 14 or multiple beacons 14, which are integrated in a lighting installation, it can be provided that a central control system 22 addresses all of the lighting devices 10 and beacons 14, respectively, in an installed lighting system. Then, the accuracy of the location can for example be centrally influenced such that the accuracy can optionally be improved or even reduced, for example for reasons of the business model.

Figure 4:
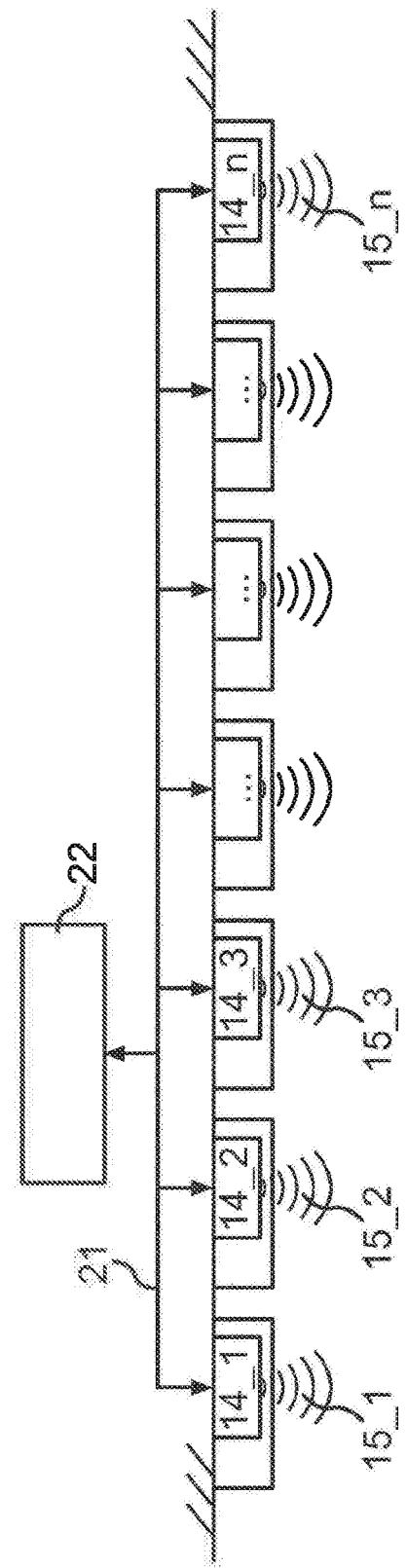

As illustrated in FIG. 4, it can be provided that the central control system 22 controls multiple beacons 14_1, 14_2, 14_3 to 14_n via a communication network 21, for example a WLAN network ("WiFi"), which each emit a radio signal 15_2, 15_3 to 15_n. Furthermore, it can be provided that the control of a signal to the beacon 14 additionally also controls a light-based communication by means of the respective lighting means 12 of the lighting devices 10, which are operated on the central control system 22, in the same manner. Thereby, the respective lighting device 10 can additionally also emit an identification number via the light radiated by the lighting means 12. Moreover, it can be provided that the control can specifically influence the accuracy of the position indications provided by the system with the aid of an activation independent of each other respectively of the radio-based and the light-based communication. Usually, a radio-based location is considerably more inaccurate than a light-based location.

Figure 5:
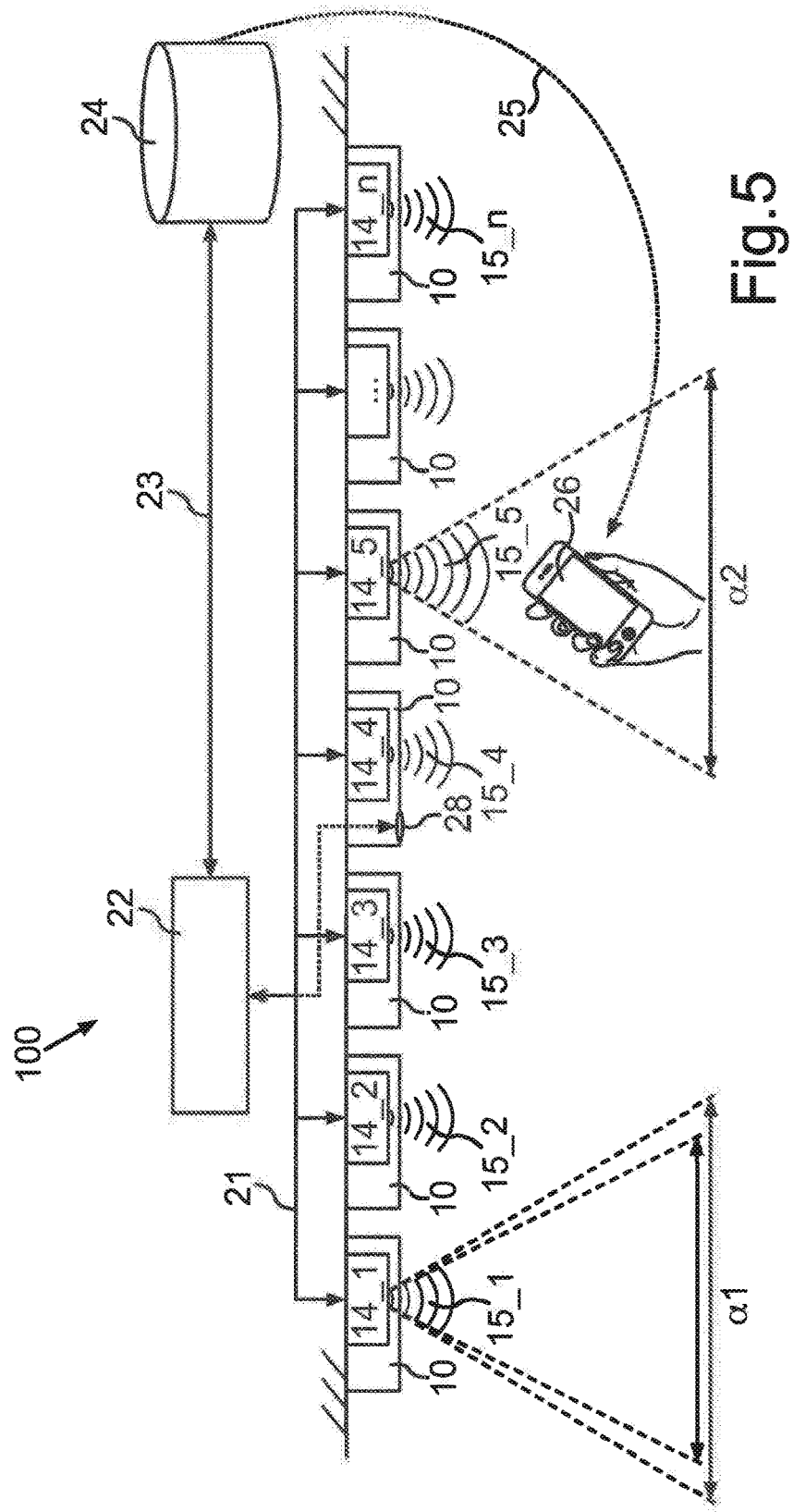

A preferred embodiment of a system 100 according to the invention for providing a position indication with a plurality of lighting devices 10 is illustrated in FIG. 5. Besides the components already illustrated in FIG. 4, it includes a central storage 24, which is in information exchange with respect to for example the adjustments and the identification numbers ID of the individual beacons 14_1 to 14_n with the central control system 22 via a data link 23. The central storage 24 further provides a wireless data transmission 25 for example via WLAN, by means of which a user with a mobile terminal 26 can send position inquiries to the central storage 24 and in reverse obtains the position indication via the wireless data transmission 25.

Alternatively or additionally, it can be provided that the position ascertainment is allowed by the mobile terminal 46 also without an existing online link to the central storage 24 by for example previously downloading the relevant adjustments or the identification numbers ID from the central storage 24 to the mobile terminal 26. In this manner, an offline operation is also possible, which is particularly advantageous especially in areas of a building, in which there is no network connection, in particular neither via WLAN nor via a mobile radio network.

Furthermore, the adjustability of the respective transmitting cones, that is the radiation areas of the respective position identification signals 15_1 to 15_n, is exemplified in the representation in FIG. 5. Here, a first transmitting cone α1 is exemplarily illustrated, which is correlated with a first ID radio signal 15_1 with a first signal strength x. Herein, the first transmitting cone α1 is advantageously adjustable to adapt it to the distribution of the lighting devices 10 such that a presettable overlap scheme with the adjacently arranged beacons 14 can be achieved. According to the representation in FIG. 5, the mobile terminal 26 is within a transmitting cone α2 of the beacon 14_5, which provides an ID radio signal 15_5 with a second signal strength y. As indicated in the graphic representation, herein, the second signal strength y is greater than the first signal strength x.

The system 100 can be expanded by an environmental sensor for example in the form of a camera 28, which captures environmental data, for example a height or objects located in the capturing range of the camera. Herein, the camera 28 can be controlled by the central control system 22. The central control system 22 captures the height and the surroundings of the system 100 via the camera 28 or another sensor element, for example a radar sensor, a laser-based distance measuring sensor, an ultrasonic sensor, and now correspondingly adjusts the level of the signal strength, for example the first signal strength x or the second signal strength y, in autonomous manner.

In addition, the respective transmitting cone, for example the first transmitting cone α1 or the second transmitting cone α2, can also be adapted such that the radio signal 15, for example the radio signal 15_1 or the radio signal 15_5, is reflected for example on metal shelves or disturbed in reduced manner.

Moreover, it can be provided that all of the adjustments are transmitted to the central storage 24, in particular the emitted identification numbers ID, in order that they can then in turn be provided to an apparatus on site, for example the mobile terminal 26, which requires the identification numbers ID for location.

Preferably, it can be provided to use the system 100 besides the transmission of position data and/or position determination data, in particular identification numbers ID of the respective lighting devices 10 or the associated beacons 14, to distribute further data via the communication network formed of the beacons 14_1 to 14_n, which is required at the respective location, for example the current area of stay of the mobile terminal 26.

Alternatively or additionally, it can be provided to distribute further data via the mentioned communication network via the system 100 besides the position data, which is locally obtained at one of the lighting devices 10, for example camera data from the camera 28, which is integrated in the lighting device 10, which includes the beacon 14_4. Thus, all of the beacons 14 within the system 100 can advantageously constitute a communication network, which offers an alternative way for data communication.

The embodiments only serve for explaining the invention and are not restricting for it. In particular, the coupling to the operating device 18 for energy supply of the beacons 14 according to the preceding representation can be arbitrarily combined with the coupling related to data technology for controlling the beacon 14 without departing from the spirit of the invention, wherein further possibilities for providing control data can be provided.

Thus, it was shown above how a (radio) beacon can be integrated in a lamp with an energy supply and control to in particular minimize the maintenance requirement.

The invention claimed is:

1. A lighting device comprising:
a first lighting source,
a transmission module for wirelessly transmitting and providing a position identification signal including position determination data, and
an electronic operating device for operating the first lighting source,
wherein the electronic operating device is coupled to an electrical supply connection of the lighting device on the input side and to the first lighting source by a first connection device on the output side,
wherein the electronic operating device includes an energy converter for supplying the transmission module with electrical energy,
wherein the transmission module comprises an interface by which the position identification signal to be emitted by the transmission module is adjustable with respect to physical signal characteristics,
wherein the lighting device comprises an environmental sensor,
wherein the operating device is adapted to adjust at least one physical signal characteristic of the position identification signal to be emitted by the transmission module depending on an environmental parameter ascertained by the environmental sensor,
wherein an orientation and an aperture angle of a transmission cone is adjusted depending on the ascertained environment.

2. The lighting device according to claim 1,
wherein the transmission module is arranged immediately at the first lighting source.

3. The lighting device according to claim 1,
wherein the operating device comprises a second connection device for the transmission module different from the first connection device for the first lighting source.

4. The lighting device according to claim 1,
wherein the second connection device is formed by a connection device for a second lighting source, which is formed functionally identically to the first connection device.

5. The lighting device according to claim 4,
wherein the operating device is adapted to control the interface of the transmission module via the second connection device.

6. The lighting device according to claim 5,
wherein the interface is formed as a two-wire interface.

7. The lighting device according to claim 6,
wherein the interface is formed as a combined energy/data interface.

8. The lighting device according to claim 5,
wherein the operating device is adapted to transmit the adjusting parameters via the interface to the transmission module depending on a signal of a superordinated light control system capable of being provided at a control interface of the operating device,
wherein this signal includes the adjusting parameters for the transmission module.

9. The lighting device according to claim 1,
wherein at least the first connection device includes a readout device, which is adapted to read out at least one operating value presettable by a compatible first lighting source and to provide the quantity correlated with the operating value via the connection device.

10. The lighting device according to claim 9,
wherein the at least one operating value presettable by a compatible first lighting source is a rated current.

11. The lighting device according to claim 1,
wherein the transmission module is adapted to bidirectionally communicate with a control unit capable of being provided outside of the lighting device at least in a calibration operating mode of the transmission module.

12. The lighting device according to claim 1,
wherein the first lighting source includes at least one LED module, wherein the transmission module is coupled to at least one LED of the LED module in a parallel manner for supply with electrical energy.

13. The lighting device according to claim 12,
wherein the transmission module is coupled to exactly one LED of the LED module.

14. A system for providing a position indication with a plurality of lighting devices respectively according to claim 1,
wherein the position determination data of the lighting devices each includes an identification number unique within the system, as well as with a data storage unit including a user interface,
wherein the installation location of the respective lighting device is stored as a function of the respective identification number in the data storage unit for each lighting device of the system,
wherein the data storage unit is adapted to output the position indication via the user interface depending on the respective identification number, which is receivable via the user interface.

15. The lighting device according to claim 2,
wherein the transmission module is formed integrally with the first lighting source.

16. A method for operating a lighting device with a first lighting source comprising:
providing a position identification signal including position determination data by a transmission module,
operating the first lighting source by an electronic operating device,
supplying the transmission module with electrical energy by an energy converter of the electronic operating device, by an interface of the transmission module, adjusting the position identification signal to be emitted with respect to physical signal characteristics,
by the operating device, adjusting at least one physical signal characteristic of the position identification signal to be emitted depending on an environmental parameter ascertained by an environmental sensor, and
adjusting an orientation and an aperture angle of a transmission cone depending on the ascertained environment.

* * * * *